Nov. 8, 1927.
J. R. MESTON ET AL
1,648,558
OIL AND WATER SEPARATOR
Filed March 5, 1925
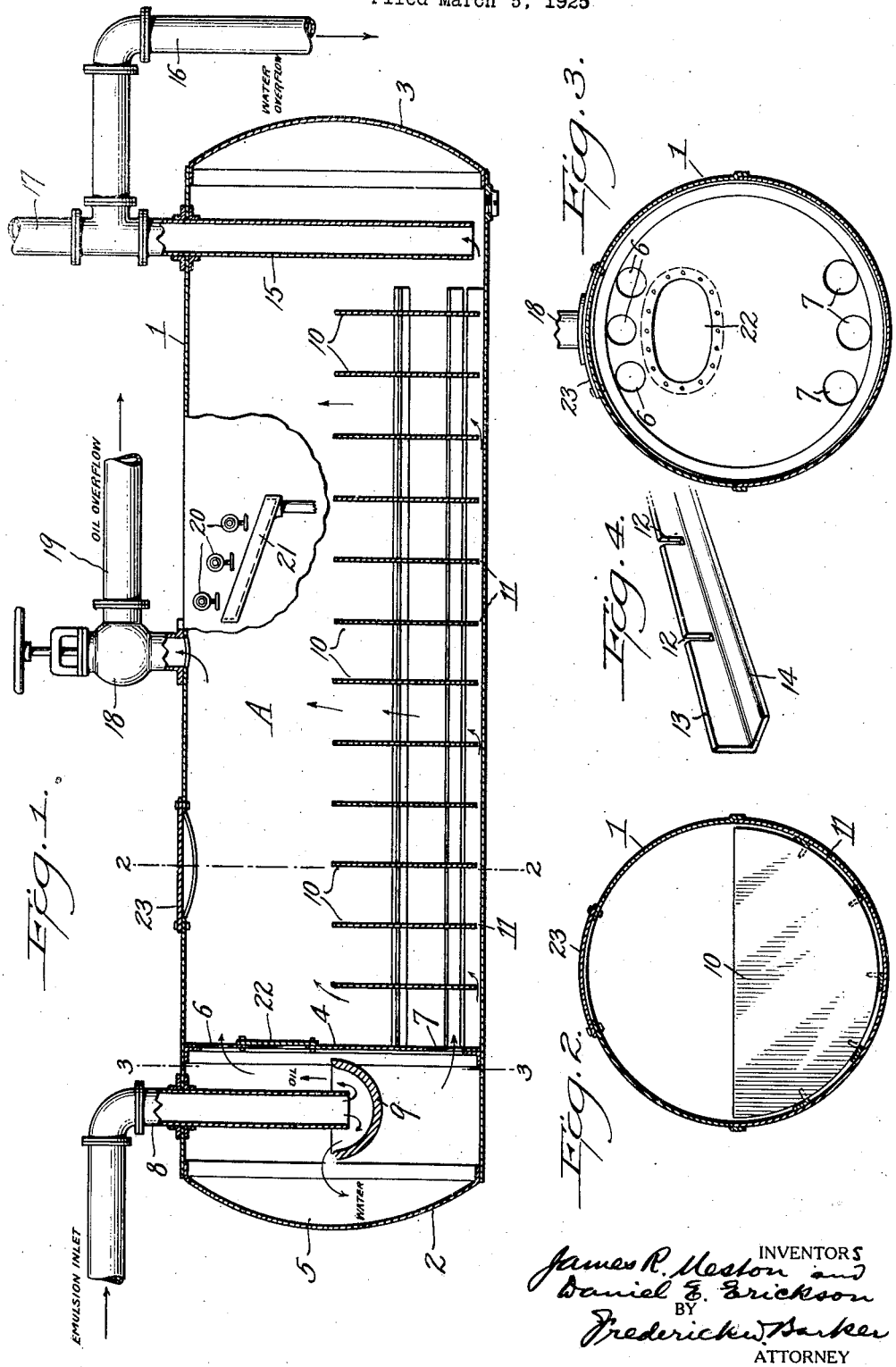
INVENTORS
James R. Meston and
Daniel E. Erickson
BY
Frederick W. Barker
ATTORNEY Patented Nov. 8, 1927.

1,648,558

UNITED STATES PATENT OFFICE.

JAMES R. MESTON AND DANIEL E. ERICKSON, OF SEATTLE, WASHINGTON, ASSIGNORS TO TODD SHIPYARDS CORPORATION, OF NEW YORK, N. Y., A CORPORATION OF NEW YORK.

OIL AND WATER SEPARATOR.

Application filed March 5, 1925. Serial No. 13,312.

This invention relates to oil and water separating means, and our improvements are directed to a closed tank or vessel having an emulsion receiving compartment at one end, water discharging means at the other end, and a series of intermediate baffles disposed transversely across the tank, in spaced relation with each other, said baffles being also in spaced relation to the tank surface and extending vertically only part-way through the tank height from near the bottom thereof.

An essential feature of our invention resides in the spacing of all the baffles from the adjacent surface of the tank, leaving a clearance, because thereby the heavier liquid, either clear water or water carrying a small proportion of oil can have uninterrupted flow throughout the length of the tank, and can rise between the baffles, thereby preventing agitation and re-emulsifying such as results when the liquid has to rise over baffles to fall by gravity into succeeding compartments.

The baffles, being spaced from the tank surface, may be termed filming plates, because the oil tends to spread upon the baffle surfaces, allowing the heavier liquid to follow the continuous flow.

The reception compartment is provided with both lower and upper means of communication with the baffle equipped compartment, so that the heavier liquid may enter the latter from a low level without having to gravitate through and disturb the upper layer of oil which is in process of formation; while the liquid entering the baffle equipped compartment through the upper communicating means, being largely oil that has risen to the top of the reception compartment, will smoothly enter the oil layer that forms in the upper levels of the tank.

The water discharge means is arranged to operate under head pressure, a vent in said discharge means being provided to prevent siphonage; while oil is to be discharged through overflow means at the tank top.

Other features and advantages of our invention will hereinafter appear.

In the drawing:

Figure 1 is a side sectional elevation of an apparatus embodying the features of our invention.

Fig. 2 is a section on the line 2—2 of Fig. 1.

Fig. 3 is a section on the line 3—3 of Fig. 1, and

Fig. 4 is a perspective detail view of an angle bar provided with slotted seats to receive the baffles.

In said figures let 1 indicate a horizontally disposed vessel or tank, here shown as circular in cross-section, and provided with respective end closure means 2, 3. Toward the end 2 there is provided a diaphragm 4 within the tank, forming at that end a reception compartment 5, said diaphragm being pierced with one or more openings 6 near its upper end and one or more openings 7 near its lower end. An inlet pipe 8 is entered through the top of the reception compartment and extended down to an intermediate position in said compartment. Just below the exit mouth of pipe 8 is supported a cup 9, to receive emulsion that is caused to enter compartment 5 through pipe 8, said cup serving to break the force of the falling liquid column, thereby minimizing the extent of the disturbance created within the receiving compartment, and enabling the oil of the entered emulsion to more rapidly assume its flotation level. Hence the liquid which passes through the lower openings 7 will be partially freed from oil, while the liquid which passes through the upper openings 6 will be mostly oil.

The main portion, or compartment A, of the tank outside compartment 5 is equipped with a series of transverse baffles or filming plates 10 which extend vertically from the lower portion of the tank to a point about midway the height thereof, said baffles conforming in shape with the contour of the tank, and being spaced from the adjacent tank surface to provide the intervening clearances 11, for a purpose to be described hereinafter.

In the example here shown the baffles are engaged in notches or slots 12 provided in the flanges 13 of angle irons, whose webs 14 are secured to the tank. The angle irons are extended longitudinally within the tank, in parallel, spaced relation, and serve as supporting means for the baffles, whose peripheral edges are thereby held apart from the tank surface.

Near the end 3 of the tank, beyond the series of baffles, we provide a water discharge pipe 15, which depends through the tank top and extends nearly to the tank bottom, said pipe having a return bend 16 outside the tank to carry off the clear water, said pipe 15 extending upwardly at 17 beyond its junction with return bend 16, to vent the said pipe and prevent siphoning of the tank contents; it being understood that the water overflow occurs through head pressure.

The oil delivery means, which may be in the form of a valve 18, is secured in the tank top, and has a communicating pipe 19 to convey the oil to a suitable place. Test cocks 20 with a drip trough 21 are shown as applied to the tank to determine the state of the oil at different levels.

Manholes 22, 23 may be provided respectively in the partition 4 and tank 1.

In the operation of our improved separating means the heavier liquid entering the baffled part of the tank from compartment 5 through openings 7 will have continuous flow along the lower portion of the tank through the clearances left between the peripheral edges of the baffles and the tank surface; the emulsion also welling up between the baffles and a proportion of the oil filming or spreading upon the baffle surfaces; while the water tends to enter the continuously flowing stream. The oil trapped between the baffles, and caught by their surfaces, is undisturbed for the reason that no water-containing mixture or emulsion falls therethrough to set up agitation and create re-emulsification. The flow through the upper openings 6 will be practically of oil alone, since said openings are provided near the top of partition 4, above the water level in compartment 5, and this entering oil will be added to the layer of oil that has formed within the baffle compartment, above the baffles.

The flowing stream is mostly of clear water, and its motion has no tendency to agitate the interior body of liquid between the baffles, so that separation by gravitation may proceed under the most favorable condition, the emulsion being in a state of rest.

Variations within the spirit and scope of our invention are equally comprehended by the foregoing disclosure.

We claim:

1. In an oil and water separator, in combination, a horizontally disposed, cylindrical vessel having an emulsion receiving compartment at one end and a main compartment provided with a series of baffles along its length, said receiving compartment provided with means intermediate its height to intercept the flow of emulsion, to prevent disturbing the contents, and means of communication between said compartments, the lower edges of said baffles being concentric with and spaced from the vessel surface to permit the continuous flow of the heavier liquid in a longitudinal stream between the baffles and the lower surface of the vessel and filming of the oil upon the baffles.

2. In an oil and water separator, in combination, a horizontally disposed, cylindrical vessel, having an emulsion receiving compartment at one end, a main compartment, a series of spaced, transverse baffles arranged successively along said main compartment, the lower edges of said baffles being concentric with and spaced from the vessel surface to permit continuous flow of the heavier liquid in a longitudinal stream along the main compartment, and filming of the oil upon the baffles, means of communication between said receiving and main compartments, means at one end of the vessel for discharging the separated water under head pressure, and vent means for said discharging means.

3. In an oil and water separator, in combination, a horizontally disposed, cylindrical vessel having an emulsion receiving compartment at one end, a main compartment, a series of spaced, transverse baffles arranged successively along said main compartment, the lower edges of said baffles being concentric with and spaced from the vessel surface to permit continuous flow of the heavier liquid in a longitudinal stream along the main compartment, and filming of the oil upon the baffles, means of communication between said receiving and main compartments, and means in the upper part of the vessel for discharging the separated oil under head pressure.

4. Means for separating mingled oil and water which comprises a horizontally disposed, cylindrical vessel, provided with emulsion reception means and having a series of filming plates disposed in its lower portion along its length, said plates being spaced from each other, and the lower edges of said plates being concentric with and spaced from the portion of the vessel they occupy, thereby permitting the flow of heavier liquid in a longitudinal stream between the edges of said plates and the vessel surface, while filming of the contained oil occurs upon said plates, and respective means for the discharge of separated oil and water under head pressure.

Executed this 12th day of February, 1925.

JAMES R. MESTON.
DANIEL E. ERICKSON.